(12) United States Patent
Duraisamy et al.

(10) Patent No.: US 10,866,947 B2
(45) Date of Patent: Dec. 15, 2020

(54) CONTEXT BASED CHART VALIDATIONS

(71) Applicant: SAP SE, Walldorf (DE)

(72) Inventors: Ganesh Moorthy Duraisamy, Chinnamadham Palayam (IN); Poornima Umashankar, Bangalore (IN)

(73) Assignee: SAP SE, Walldorf (DE)

( * ) Notice: Subject to any disclaimer, the term of this patent is extended or adjusted under 35 U.S.C. 154(b) by 263 days.

(21) Appl. No.: 15/455,839

(22) Filed: Mar. 10, 2017

(65) Prior Publication Data

US 2018/0260431 A1    Sep. 13, 2018

(51) Int. Cl.
*G06F 16/23* (2019.01)
*G06T 11/20* (2006.01)

(52) U.S. Cl.
CPC ........ *G06F 16/2365* (2019.01); *G06T 11/206* (2013.01)

(58) Field of Classification Search
CPC .......................... G06F 17/30371; G06T 11/206
See application file for complete search history.

(56) References Cited

U.S. PATENT DOCUMENTS

| | | | |
|---|---|---|---|
| 5,513,271 A | 4/1996 | Rao et al. | |
| 7,667,582 B1 * | 2/2010 | Waldorf | G06T 11/206 340/440 |
| 8,723,869 B2 | 5/2014 | Kaushal et al. | |
| 2004/0252136 A1 * | 12/2004 | Bhatt | G06F 16/248 345/619 |
| 2008/0148140 A1 | 6/2008 | Nakano | |
| 2009/0024556 A1 * | 1/2009 | Hirsch | G06F 16/951 706/55 |
| 2010/0103177 A1 | 4/2010 | Shinohara et al. | |
| 2012/0272186 A1 | 10/2012 | Kraut | |
| 2014/0244364 A1 | 8/2014 | Evers et al. | |
| 2015/0061889 A1 | 3/2015 | Kotaki et al. | |

(Continued)

FOREIGN PATENT DOCUMENTS

| | | |
|---|---|---|
| CN | 103927465 A | 7/2014 |
| JP | 2000122776 A | 4/2000 |

OTHER PUBLICATIONS

Correlate and Compare Graphs, http://www.oracle.com/webfolder/ux/applications/DPG/OBIEE/patterns/correlate_compare/index.html, 3 pp.

*Primary Examiner* — Ashish Thomas
*Assistant Examiner* — Aryan D Toughiry
(74) *Attorney, Agent, or Firm* — Buckley, Maschoff & Talwalkar LLC

(57) ABSTRACT

A system, method, and computer-readable medium to receive a definition of a first chart; determine a chart type for the first chart based on the definition; calculate, based on the determined first chart type, proportion values for chart elements of the first chart; receive a definition of a second chart; determine whether a chart type for the second chart is the same as the first chart type; calculate, in response to the determination that the second chart type is the same as the first chart type, proportion values for the chart elements of the second chart based on the first chart type; determine whether the second chart is a valid representation of the first chart based on the calculated proportion values for the first chart and the second chart; and store a record of the validation determination.

20 Claims, 8 Drawing Sheets

(56) References Cited

U.S. PATENT DOCUMENTS

2015/0067568 A1* 3/2015 Lee ................... G06F 3/04842
                                                    715/771
2015/0193719 A1   7/2015 Than et al.
2016/0170611 A1* 6/2016 Hao ................... G09B 29/007
                                                    715/781

* cited by examiner

CONTEXT BASED CHART VALIDATIONS

BACKGROUND

Enterprise software systems receive, generate, and store data related to many aspects of an enterprise. Reporting tools may access the data and present the data in a variety of graphic visualizations, including different types and formats of graphs and charts. The visualizations might be used by consumers thereof to gain insights into the operations of the enterprise and/or other purposes. As such, accurate visualizations of the data are needed to convey the underlying data in a consistent, meaningful, and useful manner.

Conventional validation tests may be geared to validating transactional data, as opposed to analytical data that might be represented as graphical visualizations. Some prior techniques for comparing graphs and charts to each compare a first rendered chart to a second rendered chart based on pixel-by-pixel comparison of the rendered charts. Using this the technique however is problematic since, for example, any variation in the compared pixels of the charts results in a failure since there is a difference in the pixels' values. For example, a difference in screen resolutions for the displays presenting the rendered charts may cause a mismatch in the pixels of the two charts.

DETAILED DESCRIPTION

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

Figure 1:
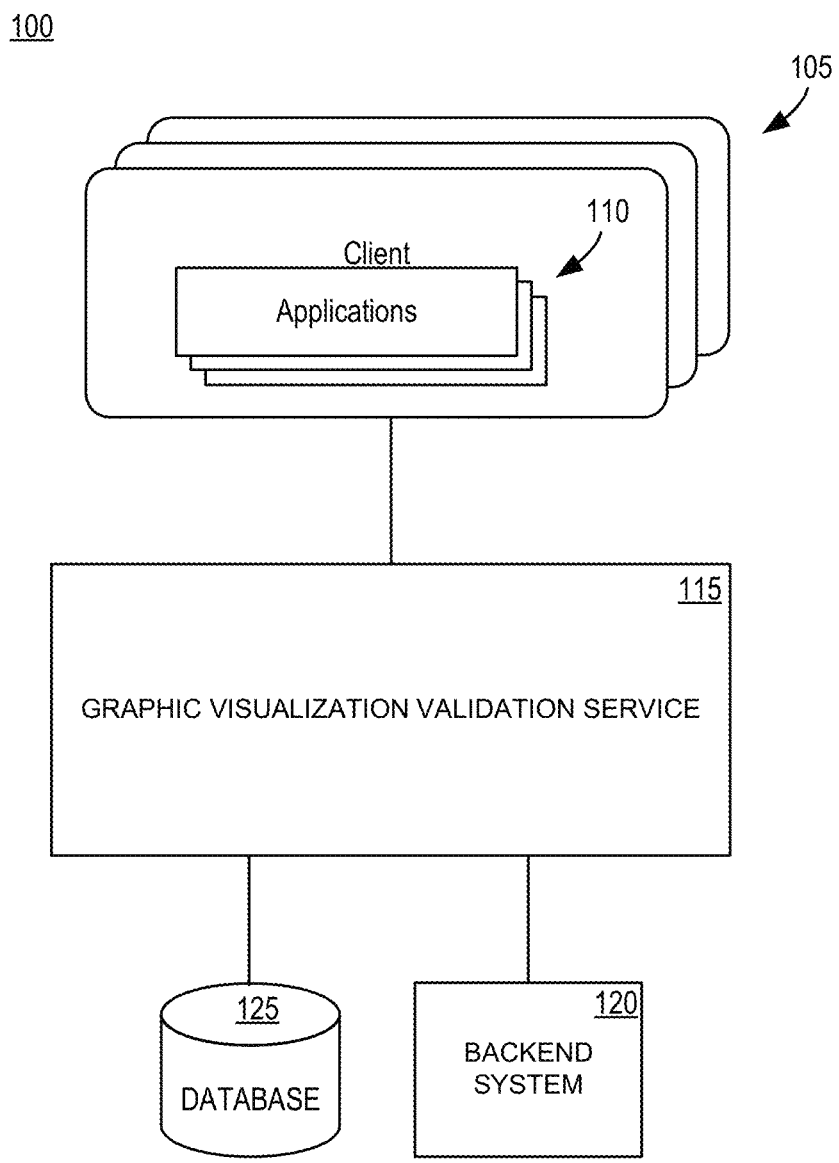
FIG. 1 is an example block diagram of a system architecture.

FIG. 1 is an illustrative block diagram of an architecture or system 100, in one example. Examples of some embodiments of the present disclosure are not limited to the particular architecture 100 shown in FIG. 1. System 100 includes one or more client devices 105 running one or more applications 110. Applications 110 may, in some embodiments, include a suite of different software applications having, at least to some extent, related functionality, similar user interfaces, and some ability to exchange data with each other. Applications 110 may include different software applications that support the operations and process of an organization. In some embodiments, one of the applications 110 may include functionality or a tool to validate graphical visualizations, including graphs and charts. In some embodiments, applications 110 may be configured to facilitate, support, and execute a program to validate and otherwise determine whether two or more visualizations are equivalent representations of each other based on a context of the visualizations. The visualization validations processed herein may be implemented by an application.

System 100 includes a graphic visualization validation service or server 115. In some embodiments, a functionality or service for validating visualizations with reference to a baseline or reference visualization of one or more different types may be deployed as a cloud-based service, whereas in some other embodiments system 100 may include a client-server architecture. System 100 may encompass both scenarios. In the instance system 100 includes a server at 115, the devices at 105 may be client devices running applications, as discussed above, having graphical user interfaces. In an instance the system includes a cloud-based server at 115, the devices at 105 may execute a browser that is used by a user to interface with service 115.

System 100 further includes a backend system that can, automatically in some instances, in response to a request or call from graphic visualization validation service 115, execute tasks, scripts, code, or instructions to perform a process to validate and/or support the validation of visualizations managed, at least in part, thereby. In some aspects herein, a user may provide an indication or request the validation of one or more visualizations, as implemented in an application 110 and/or server or service 115, which may operate in cooperation with the processing of backend system 120 to generate a response to effectuate the chart and graph processing that may be used in determining the requested visualization validations where like visualizations have the same proportions for the visualization elements comprising the charts and graphs therein.

In one example, a client 105 executes an application 110 to present one or more visualizations via a user interface (UI) to a user on a display of client 105. The user manipulates UI elements within the UI to indicate and specify a visualization to include in a desired validation, where a server or service 115 embodying the graphic visualization validation service operates, in cooperation with backend system 120 and database 125 to determine, based on a definition for the visualization and a chart type indicated thereby, proportion values for the visualization. The proportion values for the visualization may be used to automatically establish, accurately, efficiently and quickly, a reference for a reference chart/graph and to validate the visualization with a reference chart/graph.

In some embodiments, system 100 and processes executed and/or supported thereby may be accomplished, at least in part, by a software testing framework or platform including a combination of software and hardware components. In some embodiments, system 100 may comprise a part of a testing platform, interface therewith, or be distinct therefrom.

Data store 125 may comprise any data source or sources that are now known or become known. Data store 125 may comprise a relational database, a HTML document, an eXtensible Markup Language (XML) document, or any other data storage system storing structured and/or unstructured data files. The data of data store 130 may be distributed among several data sources. Embodiments are not limited to any number or types of data sources.

Data store 125 may implement an "in-memory" database, where a full database is stored in volatile (e.g., non-diskbased) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

In accordance with some aspects of the present disclosure, a graphic visualization validation service or application herein provides a mechanism and environment that supports the comparison of subject visualizations including, for example, charts and graphs representing set(s) of data including data points, to a reference visualization to validate whether the subject visualizations are valid (i.e., equivalent) representations of the reference visualization. In some aspects of the present disclosure, the method and systems herein can use, in various combinations, one or more of a definition or specification of a visualization, a particular type of chart or graph included in the visualization, and the proportions of the visualization elements comprising the visualization to more accurately and efficiently characterize and validate the visualization relative to a reference visualization.

In some aspects herein, some embodiments base a determination of whether a visualization is an accurate, corresponding (i.e., an accurate equivalent) representation of a reference visualization on a definition or specification of the visualization. For example, in some embodiments the elements comprising a visualization may be specified in a file including a definition of the visualization, where the definition can be used by a system, application, service, or apparatus to render the visualization. In this manner, a validation of visualizations may be independent of the system, application, service, or apparatus that might render the visualization. In some embodiments herein, a basis to determine whether visualizations are valid is a definition specifying the elements comprising the visualizations, not a rendering of the visualizations.

Figure 2:
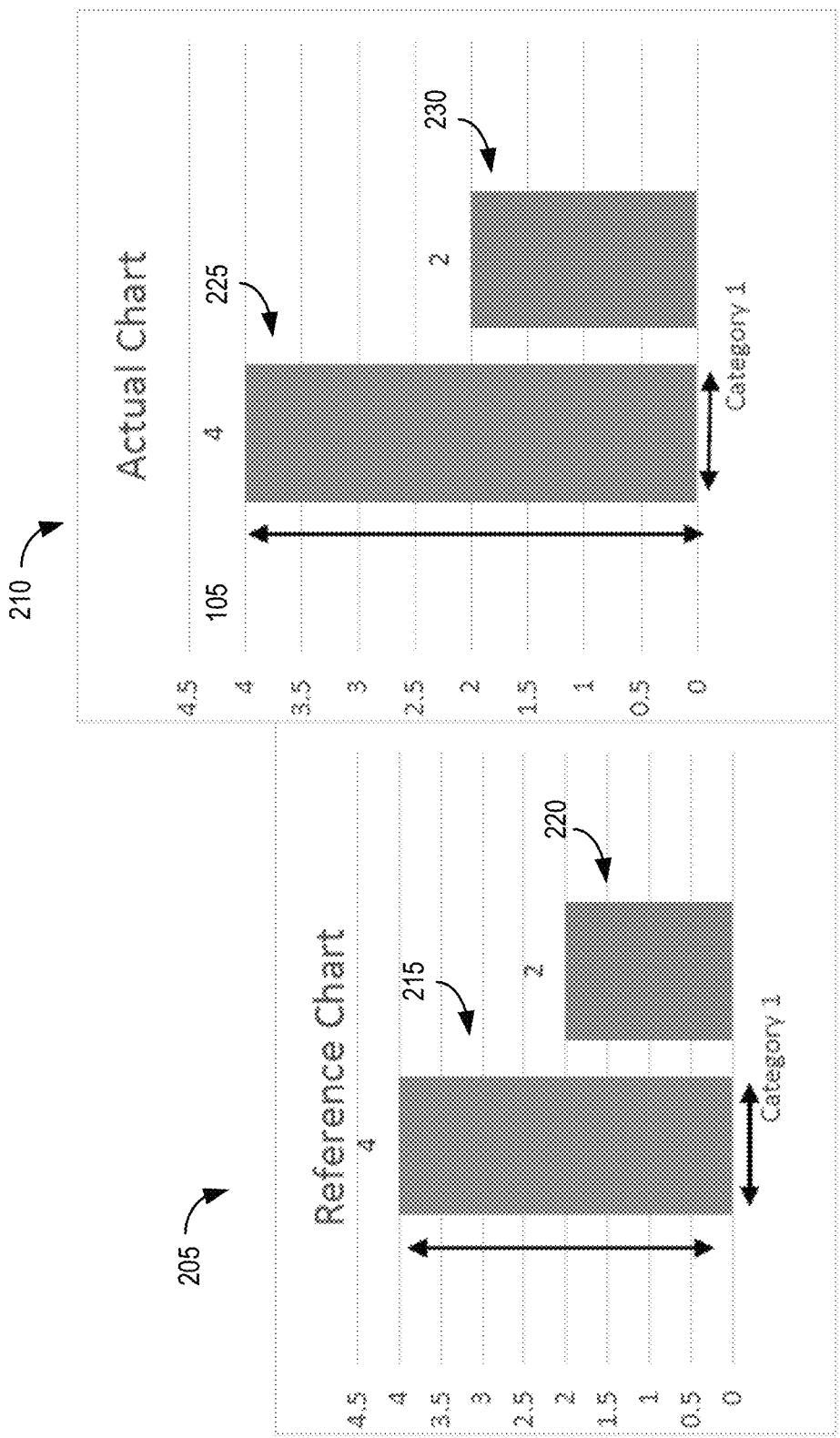
FIG. 2 is an illustrative depiction of example bar graphs that may be validated by some embodiments herein.

FIG. 2 is an illustrative depiction of graphical visualizations that may be analyzed to determine whether a subject visualization is an accurate representation of a reference visualization. In the example of FIG. 2, graphical visualization 205 is a reference chart and graphical visualization 210 is a subject chart. In some instances, a graphical visualization may be referred to herein as a chart, a graph or simply a visualization, where the terms chart and graph may be used interchangeably. In some instances herein, a reference graphical visualization may be referred to as a baseline graph or chart and a subject graphical visualization to be analyzed, compared to, or contrasted with the reference visualization may be referred to as an actual chart or graph.

In FIG. 2, reference visualization 205 is a bar chart including the chart elements of two bars. In particular, reference chart 205 includes bar 215 and bar 220. The bars in reference chart 205 generally have a rectangular shape and the area of each bar can be calculated based on the relationship of area=base×height for a rectangle. In the example of FIG. 2, reference chart 205 is rendered on a first display device (not shown) with a first resolution and the subject chart 210 is rendered on a second display device or system (not shown) at a second resolution. An analysis may be performed to determine whether subject chart 210 is an accurate (i.e., equivalent) representation of reference chart 205.

In some embodiments herein, an analysis or process to determine whether a subject chart is a valid representation of a reference chart is determined based on a definition or specification of the subject chart that may be used by a system, device, service, or application (also referred to herein at various points simply as an application but understood to encompass one or more implementations) to render or display the visualization. The definition (or a representation or indication thereof such as, a transformation of the definition) may sufficiently define the visualization such that an application, device, or system can use the definition to produce the visualization. For example, the definition may be configured as a markup language (e.g., HTML) file that includes a specification of the chart elements (e.g., bars 205 and 210) comprising a chart (e.g., reference chart 205), where the markup language is used by an application (i.e., a web browser) to render the visualization specified by the definition on a display device coupled to the browser.

Referring to FIG. 2, it is seen that the subject visualization 210 including the two bars 225 and 230 is relatively larger than reference visualization 205 that includes the bars 215 and 220. In the present example, the outward difference in appearance between reference chart 205 and subject or actual chart 210 may be attributable to a difference in resolutions of the devices displaying the charts, although this and/or other factors may weigh in to effect differences in a chart's appearance on a display device.

In some embodiments herein, a definition specifying how to render the reference chart (e.g., a first definition) and a definition specifying how to render the subject chart (e.g., a second definition) are used to determine the type of chart which is to be rendered and as the basis for determining whether the subject chart is an accurate or true representation of the reference chart. As used herein, the "context" of a visualization refers to the type of chart, specified by the definition, which is to be rendered and is used as the basis for determining whether the subject chart is an accurate or true representation of the reference chart. For example, HTML is a markup language that web browsers use to interpret and compose graphical images, text, and other aspects into visual and audible web pages. An HTML file defining the graphical elements (e.g., bars) of a chart may include mathematical values that can be used, in some embodiments herein, to determine the type (i.e., context) of graphical chart that is to be rendered, as well used by a rendering system, device, or service to render/draw the chart. In some embodiments, a system, service, or application herein might use the specified mathematical values from the definition of the chart to determine proportion values for the chart, wherein the proportion values for the chart can be used to establish a baseline or reference metric or compared to an existing baseline or reference metric.

Referring to the example of FIG. 2, an examination of an HTML file defining the bars 215 and 220 of reference chart 205 can be examined to determine the type of chart that is to be rendered. In some embodiments, mathematical values specifying the dimensions of the bars, a syntax of those values, an HTML tag, and combinations thereof may be used to determine the type of chart (i.e., context) defined by the HTML file. Additionally, the mathematical values specifying the dimensions of the bars may be used to determine the area of the bars 215 and 220. Here, the area of the chart elements 215 and 220 may be determined and represented as proportion values. For example, the areas of bars 215 and 220 of chart 205 may be calculated and represented as 10:5, which reduces to 2:1. The proportion values of 2:1 indicate bar 215 is twice the area of bar 220.

Continuing with the example of FIG. 2 an HTML file defining bars 225 and 230 of subject chart 210 is examined to determine the type of chart that is to be rendered. An examination of the HTML file defining subject chart 210 might reveal that subject chart 210 and reference chart 205 are the same type of (i.e., context) charts. Based on this determination, the file defining chart 210 might be further examined and analyzed for the mathematical values specifying the dimensions of the bars of chart 210 to determine the area of bars 225 and 230. Here, the area of the chart elements 225 and 230 may be determined and represented as proportion values. For example, the areas of bars 225 and 230 of chart 210 may be calculated and represented as 12:6, which reduces to the proportion 2:1. The proportion values of 2:1 indicate bar 225 is twice the area of bar 230. Moreover, the proportion values for reference chart 205 match the proportion values for second chart 210. As such, chart 210 may be deemed to be an accurate (i.e., equivalent) representation of the reference chart 205.

Figure 3:
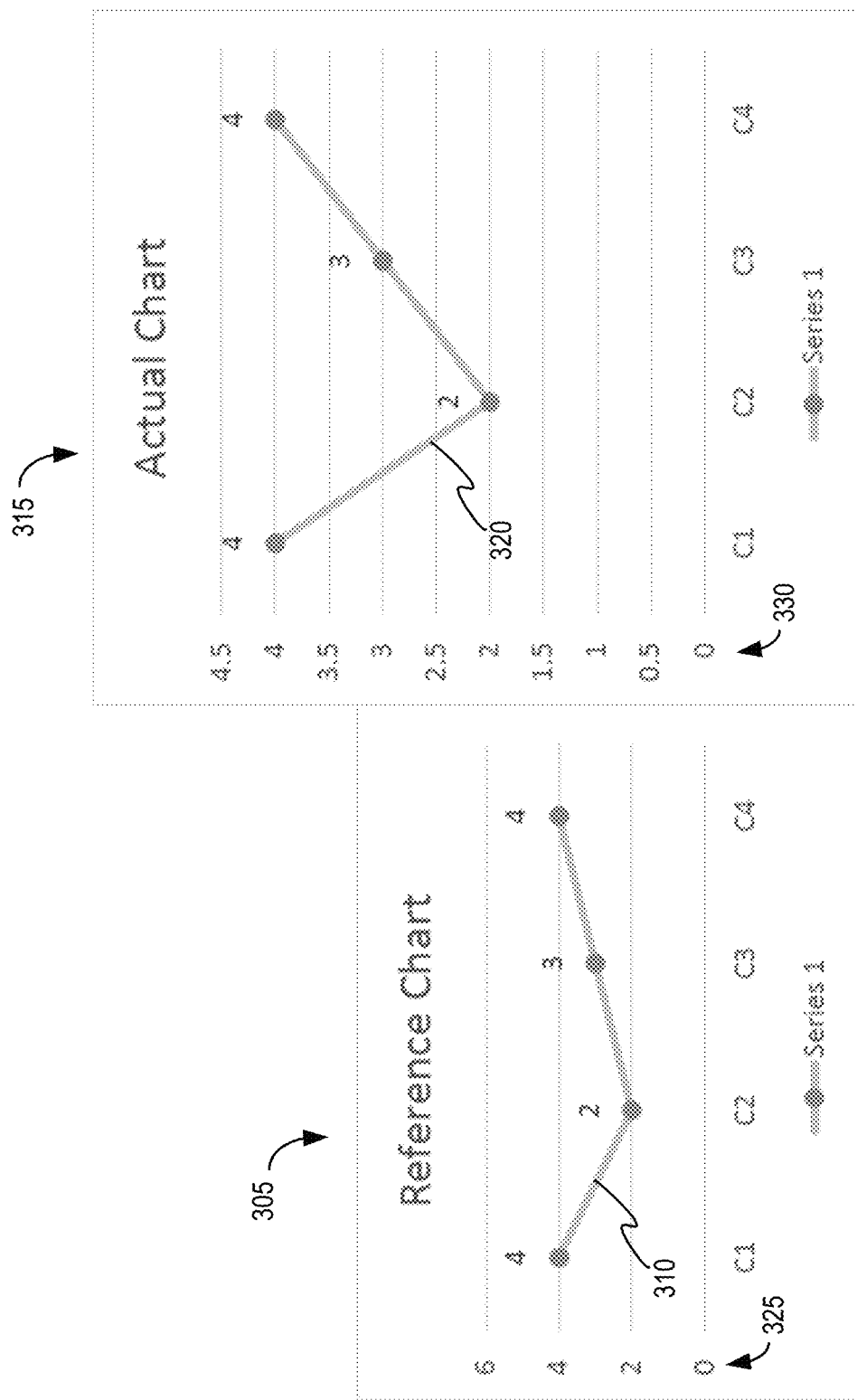
FIG. 3 is an example depiction of illustrative line graphs that may be validated by some embodiments herein.

FIG. 3 is an illustrative depiction of a reference visualization 305 including the chart element of a line chart 315 and a subject visualization 315 including the chart element of a line chart 320. The line chart in reference chart 305 includes a number of data points (e.g., 4 (C1), 2 (C2), 3 (C3), 4 (C4)). The line chart in actual or subject line chart 315 includes a number of data points (e.g., 4 (C1), 2 (C2), 3 (C3), 4 (C4)).

An analysis may be performed to determine whether subject chart 315 is an accurate (i.e., equivalent) representation of reference chart 305. In accordance with some processes herein, an analysis or process to determine whether subject chart 315 is a valid representation of reference chart 305 may be performed to determine, based on a definition or specification of the reference chart and a definition of the subject chart, whether the subject chart is an accurate or valid representation of the reference chart.

Referring to FIG. 3, it is seen that the subject visualization 315 including line chart 320 is relatively larger than reference visualization 305 that includes line chart 310. In the present example, the outward difference in appearance between reference chart 305 and subject or actual chart 310 may be attributable to a difference in resolutions of the devices displaying the charts, although this and/or other factors may impact differences in the two charts' appearance.

Still referring to the example of FIG. 3, an examination of a file (e.g., HTML or other language) defining line chart 310 of reference chart 305 can be examined to determine the type of chart (i.e., context) that is to be rendered. Here, it is determined from the definition that chart 305 includes a line chart. In some embodiments, mathematical values specifying the coordinates of the data points on line chart 310, a syntax of those values, an HTML tag, and combinations thereof may be used to determine the type (i.e., context) of chart defined by the definition of chart 305. Additionally, the mathematical values specifying the data points of line chart 310 may be used to determine proportions of the Y-axis (325) coordinates' values (e.g., y=4:2:3:4). This proportion can be reduced to y=2:1:1.5:2.

Continuing with the example of FIG. 3, an HTML file defining line chart 320 of subject chart 315 to determine the type of chart that is to be rendered. Regarding the definition for chart 315, its contents reveal that chart 315 includes a line graph (context). As such, subject chart 315 and reference chart 305 are the same type of charts (i.e., context)— line graphs. Based on this determination, the file defining chart 315 might be further examined and analyzed for the mathematical values specifying the data points of line chart 320 to determine the proportion values for the data points on line chart 320. Here, the proportion values for line chart 320 relative to Y-axis 330 are y'=4:2:3:4, that reduces to the proportion of y'=2:1:1.5:2. The proportion values for reference chart 305 match the proportion values for subject chart 315. As such, chart 315 is determined to be an accurate (i.e., equivalent) representation of the reference chart 305.

Figure 4:
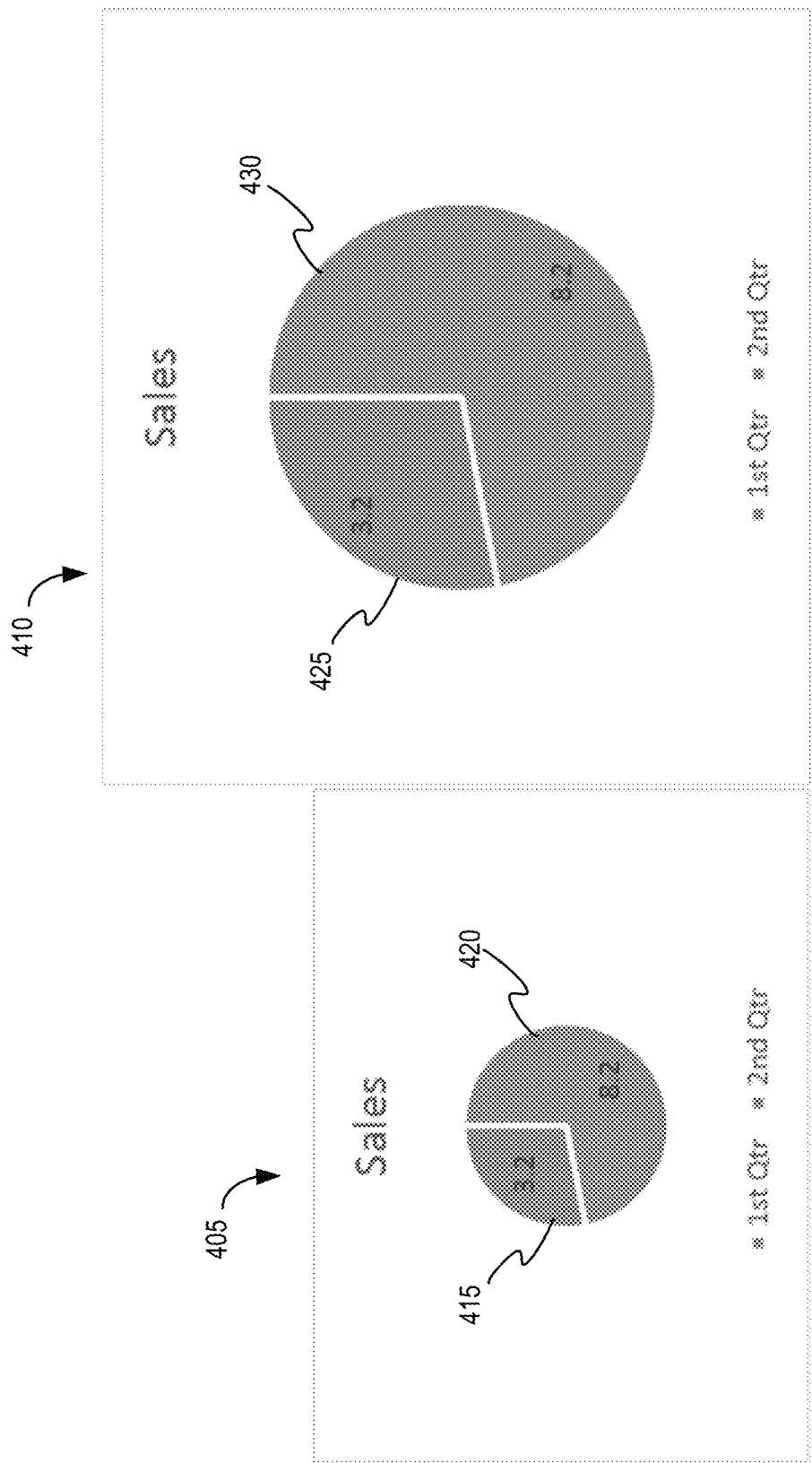
FIG. 4 is an example depiction of illustrative pie graphs that may be validated by some embodiments herein.

FIG. 4 is an illustrative depiction of a reference visualization 405 including the chart elements of a pie chart sections 415 and 420 and a subject visualization 410 including the chart elements of pie chart sections 425 and 430. A pie chart context generally includes a one or more pie chart sections that each represent a quantity.

An analysis may be performed to determine whether subject chart 410 is an accurate (i.e., equivalent) representation of reference chart 405. In accordance with some processes herein, a process to determine whether subject chart 410 is a valid representation of reference chart 405 may be performed to determine, based on a definition (including the context) of the reference chart and a definition (including the context) of the subject chart, whether the subject chart is an accurate or valid representation of the reference chart.

Referring to FIG. 4, it is seen that the subject visualization 410 including pie chart sections 425 and 430 is relatively larger than reference visualization 405 that includes pie chart sections 415 and 420. In the present example, the outward difference in appearance between reference chart 405 and subject or actual chart 410 may be attributable to a difference in resolutions of the devices displaying the charts, although this and/or other factors may impact differences in the two charts' appearance.

Regarding the example of FIG. 4, an examination of a file (e.g., HTML or other language) defining reference chart 405 can be examined to determine the type (i.e., context) of chart that it specifies. Here, it is determined from the definition that chart 405 includes a pie chart. In some embodiments, mathematical values specifying the area of each pie section (e.g., 415, 420), a syntax of those values, an HTML tag, and combinations thereof may be used to determine the type of chart (i.e., context) defined by the definition of pie chart 405. Additionally, the mathematical values specifying the area of the pie chart sections in chart 405 may be used to determine proportions of the areas of the pie sections. Referring to pie chart 405, the areas of the pie chart sections can be represented as 10:5. This proportion can be reduced to 2:1.

Continuing with the example of FIG. 4, an HTML file defining pie chart sections 425 and 430 of subject chart 410 may be analyzed to determine the type of chart it specifies. Regarding the definition for chart 410, its contents reveal that chart 410 includes a pie chart. As such, subject chart 410 and reference chart 405 are the same type of charts—pie chart. Based on this determination, the file defining chart 410 might be further examined and analyzed for the mathematical values specifying the areas of pie chart sections 425 and 430 to determine the proportion values for the area of these pie chart sections. Here, the proportion values for the area of pie chart sections 425 and 430 are 12:6, which reduces to the proportion of 2:1. The proportion values for reference pie chart 410 match the proportion values for subject pie chart 405. As such, pie chart 410 is determined to be an accurate (i.e., equivalent) representation of the reference pie chart 405.

In some aspects, the examples disclosed in FIGS. 2, 3, and 4 specifically relate to bar charts, line charts, and pie charts, respectively. These are illustrative examples of some of the types of charts that one or more of the systems and processes herein relate to and are not exhaustive of the scope of the present disclosure. At least some of the aspects disclosed with respect to the bar chart, line chart, and pie chart examples of FIGS. 2-4 may be extended to or adapted to other types (i.e., contexts) of charts, including the foregoing example charts/graphs, a geographical map, an area chart, a hash map, a Venn diagram, a histogram, a scatter plot, and combinations thereof. For example, a process to validate a subject geographical map to a reference geographical map may include calculating proportion values for the latitude and longitude coordinates of the respective geo-maps. Other types or contexts of charts, graphs, and visualizations might calculate proportion values based on an area, data points, and other factual (e.g., mathematical) data specified in a definition for a visualization.

Figure 5:
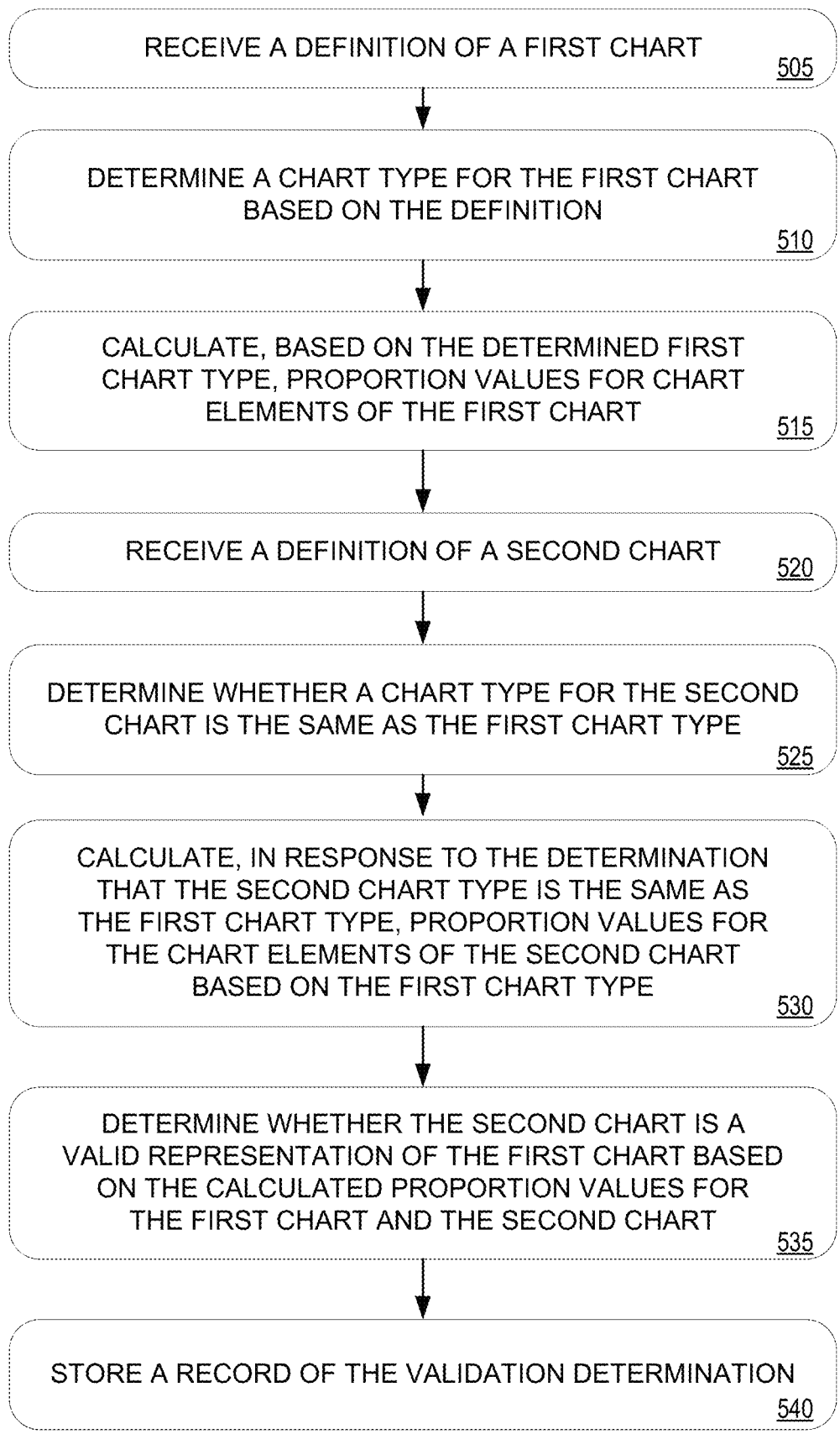
FIG. 5 is an example flow diagram of a process.

FIG. 5 is an example flow diagram of a process 500, in accordance with some embodiments herein. Process 500 may begin at an initial operation 505. At operation 505, a service, application, device, or system may receive a definition of a first chart to be rendered, where the definition defines at least one chart element for the first chart. The definition may be received in response to a user selecting or otherwise indicating that the first chart is to be processed for inclusion in a graphical visualization process, such as process 500. The definition includes a specification of the chart elements comprising the visualization or chart defined thereby. In general, a chart includes at least one chart element. As an example, the definition may be configured as a HTML file that can be read and used by a web browser to render web pages including graphical visualization elements (graphical charts/graphs, interactive UI elements, UI buttons, etc.) specified in the HTML file. In some aspects, the definition is not limited to an HTML or other markup language file but may be embodied in other data structures including a specification of the rendering characteristics of the graphical visualizations defined thereby.

At operation 510, a first chart type (i.e., context) is determined for the first chart based on the definition of the first chart, which was received at operation 510. The chart type may be explicitly stated in the definition. However, in some instances the chart type may be determined based on the specific content and/or configuration of the data in the definition. For example, a listing of data points may, alone or in conjunction with other features of a definition, indicate the definition relates to a scatter plot, a histogram, or another specific type of chart. A definition including coordinates of an axis or pair of axis, alone or in combination with other features of the definition, might indicate the definition relates to line chart, and a definition including coordinates for an area might indicate, alone or in combination with other features of the definition, a bar graph, a pie chart, a Venn diagram, and other types of charts for example. There are still other types of charts and characteristics thereof that might be specified, explicitly or implicitly, in a definition of a graphical visualization that may be used in determining the chart type at operation 510.

Operation 515 includes calculating, based on the determined first chart type from operation 510, proportion values for the chart elements of the first chart. These proportion values might be calculated directly from values included in the definition of the first chart and/or might include an intermediate calculation and/or transformation of the values included in the definition. In some aspects, the calculated proportion values may be transformed (e.g., simplified, reduced) into an alternate or substitute representative form from an initial representation.

In the present example, the first chart type (i.e., context) for the first chart causes, for example, a call to a function, script, instructions, code, commands, and other mechanisms to calculate the proportion values of the first chart, where the function, script, instructions, code, commands, and other mechanisms invoked to calculate proportion values are specific to the first chart type. In this manner, the chart type (i.e., context) of a particular chart controls which function, script, instructions, code, commands, and other mechanisms are invoked to calculate the proportion values of the given chart.

At operation 520, a service, application, device, or system may receive a definition of a second chart to be rendered, where the definition defines at least one chart element for the second chart. The definition for the second chart may be received in response to a user selecting or otherwise indicating that the second chart is to be processed for inclusion in a graphical visualization process. The definition includes a specification of the chart elements comprising the second chart defined thereby.

At operation 525, a second chart type (i.e., context) is determined for the second chart based on the definition for the second chart that was received at operation 520. The chart type may be explicitly stated in the definition or it may be determined based on the specific content and/or configuration of the data in the definition. Operation 525 might also include determining whether the chart type for the second chart is the same as the chart type determined for the first chart (i.e., operation 510).

Operation 530 includes calculating, based on the determined second chart type being confirmed to be the same as the first chart type from operation 510, proportion values for the chart elements of the second chart. These proportion values might be calculated directly from values included in the definition of the second chart's definition and/or might include an intermediate calculation and/or transformation of the values included in the definition. In some aspects, the calculated proportion values may be transformed (e.g., simplified, reduced) into an alternate or substitute representative form from an initial representation.

In the present example, the second chart type for the second chart is the same as the first chart type for the first chart. In some embodiments, proportion values for the second chart having the same chart type as the first chart may be calculated by the function, script, instructions, code, commands, and other mechanisms invoked to calculate the proportion values of the first chart, where the function, script, instructions, code, commands, and other mechanisms invoked to calculate proportion values of the first chart are specific to the first chart's chart type.

Operation 535 includes determining whether the second chart is a valid representation of the first chart based on the calculated proportion values for the first chart and the second chart. In some instances and embodiments, operation 530 determines whether the proportion values calculated for the first chart at operation 515 are equal to or equivalent to the proportion values calculated from the second chart at operation 530.

Process 500 proceeds to operation 540 where a record of the validation determination of operation 535 is stored. The record may be stored in one or more instances of a data store, a data mart, a repository, a database and aspects thereof. In some aspects, outputs (and/or intermediate determinations and calculations) of one or more of the operations process 500 may be stored, at least temporarily, in one or more instances of a data store, a data mart, a repository, a database and aspects thereof.

In some embodiments, one or more of the operations of process 500 may be performed in combination with one or more of the other operations of process 500. For example, in some instances operations 510 and 515 may be at least partially performed in parallel.

In some embodiments, additional information may be retrieved from the definition of the charts and also used to validate a chart or graph. For example, color rendering information or data such as RGB values (i.e., Red, Green, Blue values expressing the colors used to render a web page) may be parsed from a chart's definition and further used to validate charts. In some embodiments, these and other data values may be used in some aspects herein to validate charts.

In some instances, proportion values for the second chart may be calculated where the chart type for the second chart differs from the chart type of the first chart. In some such instances, a function, script, instructions, code, commands, and other mechanisms may be invoked to calculate the proportion values of the second chart, where the function, script, instructions, code, commands, and other mechanisms invoked to calculate proportion values of the second chart are specific to the second chart's chart type. As such, the function, script, instructions, code, commands, and other mechanisms used (i.e., called) to calculate the proportion values of the second chart are different that the function, script, instructions, code, commands, and other mechanisms called or invoked to calculate proportion values of the first chart. In this example, the proportion values of the second chart may be compared to a reference chart having a chart type matching the second chart's chart type.

Figure 6:
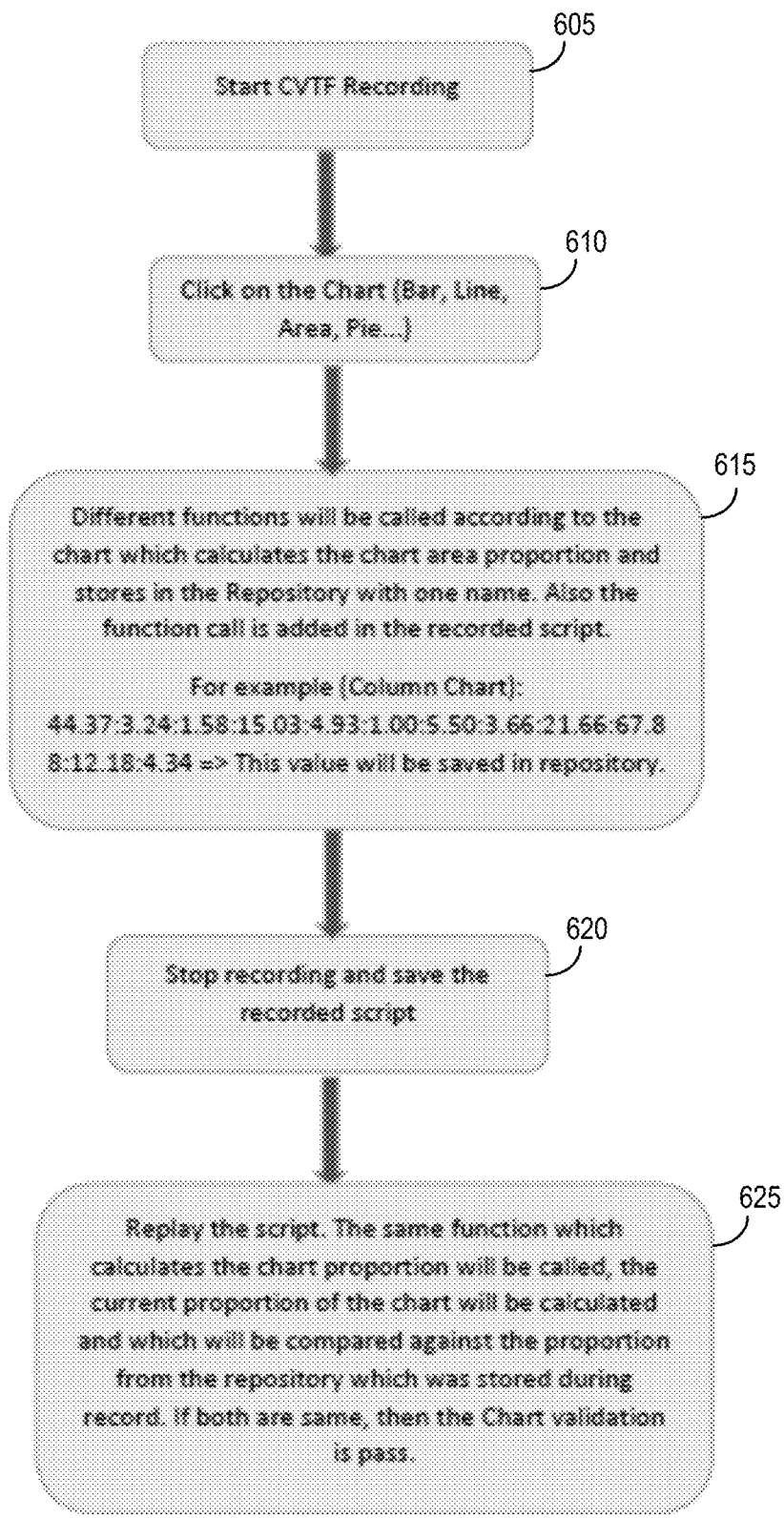
FIG. 6 is another example flow diagram of a process.

FIG. 6 is a flow diagram of an automated testing process 600 related to a graphical visualization validation process, in some example embodiments. In some instances, process 600 may be implemented as an automation tool. By way of example and not as a limitation, a software testing framework configuration may be deployed on top of Selenium that includes a record and playback tool for authoring tests. At operation 605, a recording of the automated testing tool may be started.

At 610, a user may select a particular chart via a UI of the automation tool by navigating to a particular chart of interest and selecting the chart using one or more interactive selection techniques (e.g., point and click, etc.). The chart may be any type of chart, including but not limited to a bar chart, a line chart, a pie chart, a geo-map, and any other charts compatible with the present disclosure. Upon selection of the chart at 610, the tool may respond by determining the chart type (i.e., context) of the selected chart. This chart type determination may be determined based, at least in part, based on a definition of selected chart, where the definition is embedded in a file specifying characteristics of the chart.

At operation 615, a function, script, program instructions, code, and other mechanisms are called or invoked, based on the chart type (i.e., context) of the selected chart, to calculate proportion values for the selected chart. The proportion values may be calculated based on the mathematical values specified for the selected chart in the definition thereof. An example of the actual values specified in an HTML document including the definition for a bar chart is shown in FIG. 6 at 615. The numeric values therein define values for columns for the different bars in the selected bar chart. The values are represented as a proportion as shown and further saved in a repository or other data store.

Continuing to operation 620, the recording is stopped and code, commands, and instructions automatically generated by the actions of operations 610 and 615 are saved to a recorded script. The script saved at operation 620 may serve as a control for generating proportion values for charts having the same chart type as the chart selected at operation 610.

At operation 625, the script saved at 620 may be replayed (i.e., invoked) to calculate proportion values for a current or subject chart, where the current or subject chart has a chart type that is the same as the chart used to generate the saved script. The proportion values of the current or subject chart are calculated by the called function and further compared to the proportion values from the repository (i.e., the reference chart's values) to determine whether the subject chart is a valid representation of the first, selected (i.e., reference) chart.

Figure 7:
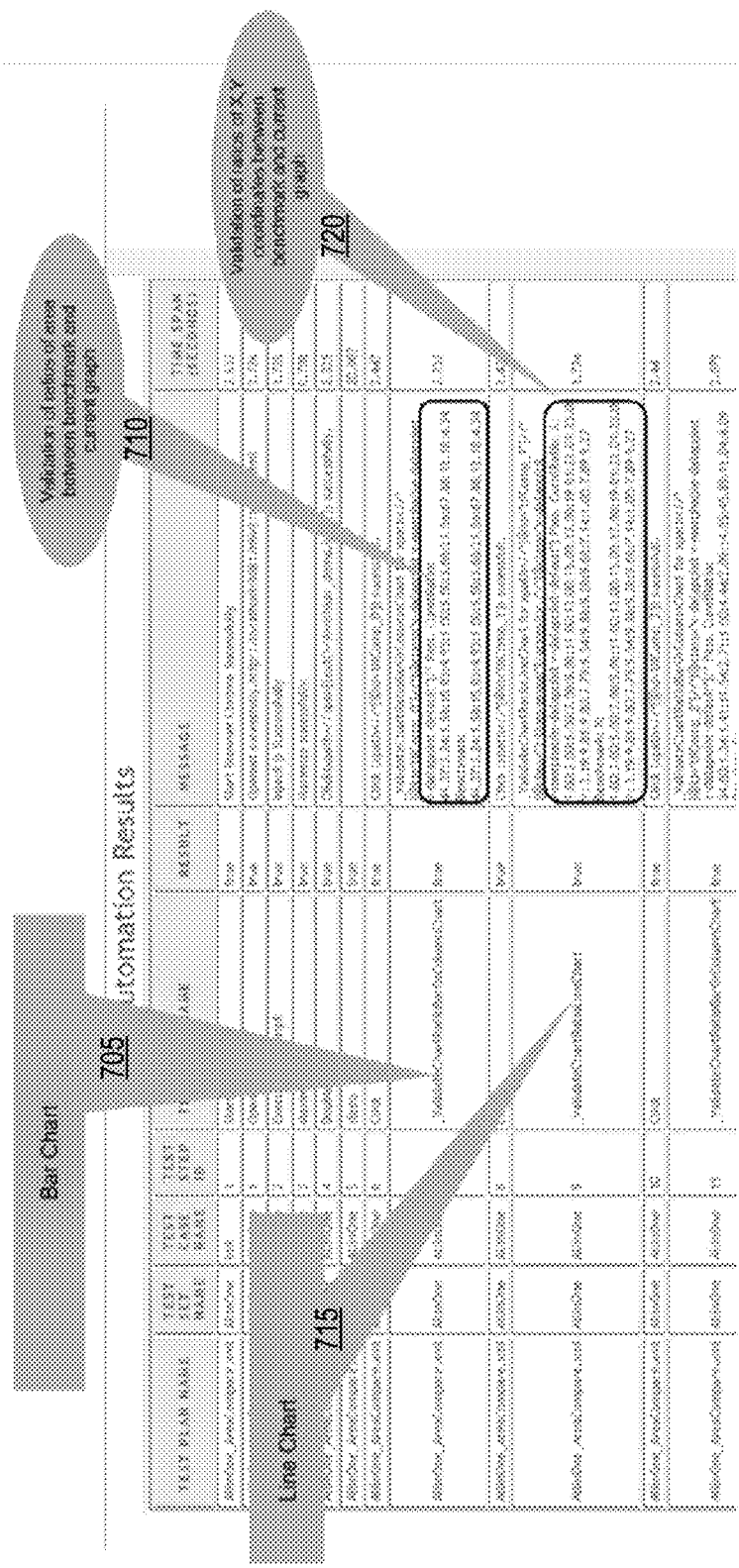
FIG. 7 is an illustrative outward view of an example screenshot related to a system of one embodiment.
Figure 8:
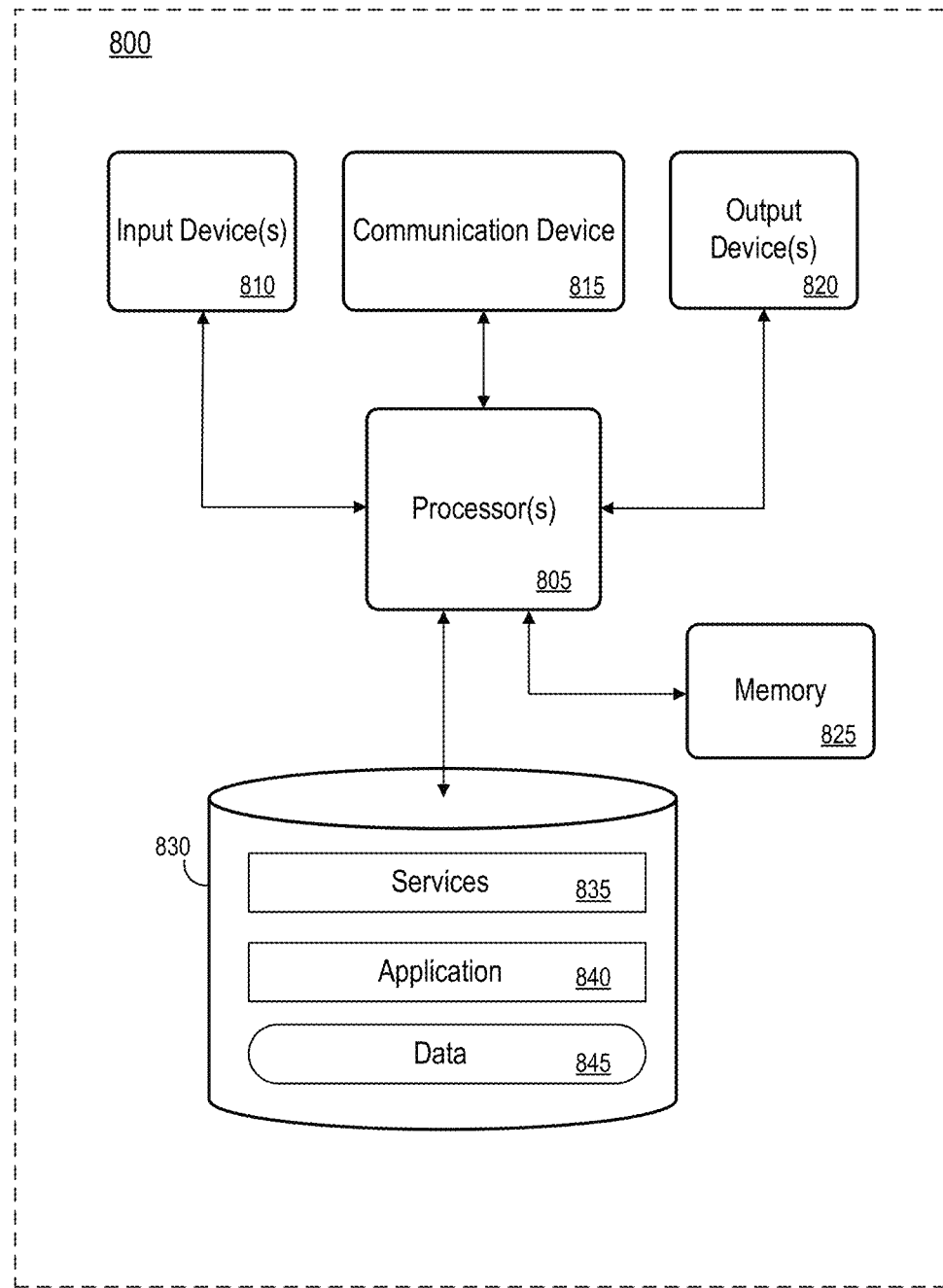
FIG. 8 is a block diagram of an example apparatus, according to some embodiments.

FIG. 7 is an outward view of a screenshot of a UI, illustrating some aspects of the present disclosure. For example, FIG. 7 includes part of a table of automation test results. As shown, a test script for validating a bar chart type of visualization is referenced at 705. The ratios (i.e., proportions) of area for a reference bar chart and the subject/current bar chart are illustrated at 710. FIG. 7 further includes a listing of a test script 715 for validating a line chart type of visualization. The ratios (i.e., proportions) of X, Y coordinates for a reference line chart and the subject/current line chart are illustrated at 720.

The examples of FIG. 7 are illustrative and neither limiting nor exhaustive regarding the present disclosure.

Apparatus 800 includes processor 805 operatively coupled to communication device 820, data storage device 830, one or more input devices 810, one or more output devices 820 and memory 825. Communication device 815 may facilitate communication with external devices, such as a reporting client, or a data storage device. Input device(s) 810 may comprise, for example, a keyboard, a keypad, a mouse or other pointing device, a microphone, knob or a switch, an infra-red (IR) port, a docking station, and/or a touch screen. Input device(s) 810 may be used, for example, to enter information into apparatus 800. Output device(s) 820 may comprise, for example, a display (e.g., a display screen), a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 825 may comprise Random Access Memory (RAM), Storage Class Memory (SCM) or any other fast-access memory.

Services 835 and application 840 may comprise program code executed by processor 805 to cause apparatus 800 to perform any one or more of the processes described herein (e.g., FIGS. 3 and 4). Embodiments are not limited to execution of these processes by a single apparatus.

Data 845 (either cached or a full database) may be stored in volatile memory such as memory 825. Data storage device 830 may also store data and other program code and instructions for providing additional functionality and/or which are necessary for operation of apparatus 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable instructions; and
   a processor to execute the processor-executable instructions to cause the system to:
   receive a definition of a first chart to be rendered, the definition defining at least a first visual chart element and a second visual chart element for the first chart;
   determine a first chart type for the first chart based on the definition of the first chart;
   determine first coordinates or a first area for the first visual chart element of the first chart;
   determine second coordinates or a second area for the second visual chart element of the first chart;
   calculate, based on: 1. the determined first chart type, 2. determined first and second coordinates or first and second area for the respective first visual chart element and 3. the second visual chart element, a ratio of:
      the determined first coordinates for the first visual chart element of the first chart to the second coordinates for the second visual chart element of the first chart, or
      the determined first area for the first visual chart element of the first chart to the second area for the second visual chart element of the first chart;
   receive a definition of a second chart to be rendered, the definition defining at least a third visual chart element for the second chart and a fourth visual chart element for the second chart;
   determine whether a second chart type for the second chart that is based on the definition of the second chart is the same as the first chart type;
   in response to the determination that the second chart type is the same as the first chart type:
      determine third coordinates or a third area for the third visual chart element of the second chart;
      determine fourth coordinates or a fourth area for the fourth visual chart element of the second chart;
      calculate, based on the determined third and fourth coordinates or third and fourth area for the respective third visual chart element and the fourth visual chart element, a ratio value of:
         the determined third coordinates for the third visual chart element of the second chart to the fourth coordinates for the fourth visual chart element of the second chart, or
         the determined third area for the third visual chart element of the second chart to the fourth area for the fourth visual chart element of the second chart;
   determine whether the second chart is a valid representation of the first chart based on the calculated ratio values for the first chart and the second chart; and
   store a record of the validation determination.

2. The system of claim 1, wherein the definition for each of the first chart and the second chart is included in a markup language file.

3. The system of claim 2, wherein the markup language is HyperText Markup Language.

4. The system of claim 1, wherein the first chart type is one of a bar chart, a line chart, a pie chart, a geographical map, an area chart, a hash map, a Venn diagram, a histogram, a scatter plot, and combinations thereof.

5. The system of claim 4, wherein the first chart is a bar chart, the first and second visual chart elements of the first chart being bars, and the ratio values for the first and second visual chart elements of the first chart being calculated by determining an area for the bars.

6. The system of claim 4, wherein the first chart is a line chart, the first and second visual chart elements of the first chart being data points on a line, and the ratio values for the first and second visual chart elements of the first chart being calculated by determining coordinates of the data points and representing them as a ratio.

7. The system of claim 4, wherein the first chart is a pie chart, the first and second visual chart elements of the first chart being pie sections, and the ratio values for the first and second visual chart elements of the first chart being calculated by determining an area for the pie sections and representing them as a ratio.

8. The system of claim 4, wherein the first chart is a geographical map, the first and second visual chart elements of the first chart being geographical map locations, and the ratio values for the first and second visual chart elements of the first chart being calculated by determining geographic coordinates for the geographical map locations and representing them as a ratio.

9. A method comprising:
   receiving a definition of a first chart to be rendered, the definition defining at least a first visual chart element and a second visual chart element for the first chart;
   determining, by a processor, a first chart type for the first chart based on the definition of the first chart;
   determining first coordinates or a first area for the first visual chart element of the first chart;
   determining second coordinates or a second area for the second visual chart element of the first chart;
   calculating, by the processor based on: 1 the determined first chart type, 2. determined first and second coordinates or first and second area for the respective first visual chart element and 3. the second visual chart element, a ratio of:
      the determined first coordinates for the first visual chart element of the first chart to the second coordinates for the second visual chart element of the first chart, or
      the determined first area for the first visual chart element of the first chart to the second area for the second visual chart element of the first chart;

receiving a definition of a second chart to be rendered, the definition defining at least a third visual chart element for the second chart and a fourth visual chart element for the second chart;

determining, by the processor, whether a second chart type for the second chart that is based on the definition of the second chart is the same as the first chart type;

in response to the determination that the second chart type is the same as the first chart type, determining by the processor, third coordinates or a third area for the third visual chart element of the second chart;

determining, by the processor, fourth coordinates or a fourth area for the fourth visual chart element of the second chart;

calculating, by the processor, based on the determined third and fourth coordinates or third and fourth area for the respective third visual chart element and the fourth visual chart element a ratio value of:

the determined third coordinates for the third visual chart element of the second chart to the fourth coordinates for the fourth visual chart element of the second chart, or the determined third area for the third visual chart element of the second chart to the fourth area for the fourth visual chart element of the second chart;

determining, by the processor, whether the second chart is a valid representation of the first chart based on the calculated ratio values for the first chart and the second chart; and storing a record of the validation determination.

10. The method of claim 9, wherein the definition for each of the first chart and the second chart is included in a markup language file.

11. The method of claim 10, wherein the markup language is HyperText Markup Language.

12. The method of claim 9, wherein the first chart type is one of a bar chart, a line chart, a pie chart, a geographical map, an area chart, a hash map, a Venn diagram, a histogram, a scatter plot, and combinations thereof.

13. The method of claim 12, wherein the first chart is a bar chart, the first and second visual chart elements of the first chart being bars, and the ratio values for the chart elements of the first chart being calculated by determining an area for the bars.

14. The method of claim 12, wherein the first chart is a line chart, the first and second visual chart elements of the first chart being data points on a line, and the ratio values for the chart elements of the first chart being calculated by determining coordinates of the data points and representing them as a ratio.

15. The method of claim 12, wherein the first chart is a geographical map, the chart elements of the first chart being geographical map locations, and the proportion values for the first and second visual chart elements of the first chart being calculated by determining geographic coordinates for the geographical map locations and representing them as a ratio.

16. A non-transitory computer-readable medium storing program instructions executable by a processor of a computing system, the medium comprising:

instructions to receive a definition of a first chart to be rendered, the definition defining at least a first visual chart element and a second visual chart element for the first chart;

instructions to determine a first chart type for the first chart based on the definition of the first chart;

instructions to determine first coordinates or a first area for the first visual chart element of the first chart;

instructions to determine second coordinates or a second area for the second visual chart element of the first chart;

instructions to calculate, based on: 1. the determined first chart type, 2. determined first and second coordinates or first and second area for the respective first visual chart element and 3. the second visual chart element, a ratio of:

the determined first coordinates for the first visual chart element of the first chart to the second coordinates for the second visual chart element of the first chart, or the determined first area for the first visual chart element of the first chart to the second area for the second visual chart element of the first chart;

instructions to receive a definition of a second chart to be rendered, the definition defining a third visual chart element for the second chart and a fourth visual chart element for the second chart;

instructions to determine whether a second chart type for the second chart that is based on the definition of the second chart is the same as the first chart type;

in response to the determination that the second chart type is the same as the first chart type, instructions to:

determine third coordinates or a third area for the third visual chart element of the second chart;

determine fourth coordinates or a fourth area for the fourth visual chart element of the second chart;

calculate, based on the determined third and fourth coordinates or third and fourth area for the respective third visual chart element and the fourth visual chart element a ratio value of:

the determined third coordinates for the third visual chart element of the second chart to the fourth coordinates for the fourth visual chart element of the second chart, or the determined third area for the third visual chart element of the second chart to the fourth area for the fourth visual chart element of the second chart;

instructions to determine whether the second chart is a valid representation of the first chart based on the calculated ratio values for the first chart and the second chart; and instructions to store a record of the validation determination.

17. The medium of claim 16, wherein the definition for each of the first chart and the second chart is included in a markup language file.

18. The medium of claim 17, wherein the markup language is HyperText Markup Language.

19. The medium of claim 16, wherein the first chart type is one of a bar chart, a line chart, a pie chart, a geographical map, an area chart, a hash map, a Venn diagram, a histogram, a scatter plot, and combinations thereof.

20. The system of claim 1, wherein the ratio specifies:

the dimensions of the elements in the chart relative to each other when the area is determined; and the position of the data points in the chart relative to each other when the coordinates are determined.

* * * * *